(12) United States Patent
Ferrer Blas et al.

(10) Patent No.: US 11,173,444 B2
(45) Date of Patent: Nov. 16, 2021

(54) SCRUBBER APPARATUS FOR A REFRIGERATED TRANSPORT CONTAINER

(71) Applicant: THERMO KING CORPORATION, Minneapolis, MN (US)

(72) Inventors: Miguel Angel Ferrer Blas, Barcelona (ES); Petra Stavova, Hostivice (CZ); Praveen Manohar G, Karnataka (IN)

(73) Assignee: Thermo King Corporation, Minneapolis, MN (US)

( * ) Notice: Subject to any disclaimer, the term of this patent is extended or adjusted under 35 U.S.C. 154(b) by 372 days.

(21) Appl. No.: 16/418,446

(22) Filed: May 21, 2019

(65) Prior Publication Data

US 2019/0366262 A1    Dec. 5, 2019

(30) Foreign Application Priority Data

May 31, 2018 (EP) ..................... 18175420

(51) Int. Cl.
  *B01D 53/06*    (2006.01)
  *A23B 7/148*    (2006.01)
  (Continued)

(52) U.S. Cl.
  CPC .............. *B01D 53/06* (2013.01); *A23B 7/148* (2013.01); *B65D 88/74* (2013.01); *F25D 17/042* (2013.01);
  (Continued)

(58) Field of Classification Search
  CPC .............. B01D 53/06; B01D 2257/504; B01D 2257/70; B01D 2259/4566;
  (Continued)

(56) References Cited

U.S. PATENT DOCUMENTS 4,228,197 A    10/1980  Means
4,642,996 A *   2/1987  Harris .................. B60H 3/0007
                                              62/78

(Continued)

FOREIGN PATENT DOCUMENTS

WO    2013/012622 A1    1/2013

OTHER PUBLICATIONS

Extended European Search Report; European Patent Application No. 18175420.1; dated Nov. 26, 2018 (7 pages).

*Primary Examiner* — Emmanuel E Duke
(74) *Attorney, Agent, or Firm* — Hamre, Schumann, Mueller & Larson, P.C.

(57) ABSTRACT

There is disclosed a scrubber apparatus 300 for a refrigerated transport container 100 having a cargo space 105, comprising: a regenerating adsorber 302; a manifold 306, 308 in fluid communication with a first side of the adsorber, an interior gas port 318, 338 for fluid communication with interior gas in the cargo space and an exterior gas port 320, 340 for fluid communication with exterior gas outside of the cargo space; and a common actuator configured to actuate both an adsorption control damper 314, 334 for controlling selective fluid communication between the adsorber and interior gas, and a regeneration control damper 316, 336 for controlling selective fluid communication between the adsorber and exterior gas. There is also disclosed a scrubber apparatus 300 which is configured to heat interior gas provided to an adsorber for removal of a controlled gas. Methods of operating a scrubber apparatus are also disclosed.

15 Claims, 5 Drawing Sheets

(51) Int. Cl.
*B65D 88/74* (2006.01)
*F25D 17/04* (2006.01)

(52) U.S. Cl.
CPC ............... *B01D 2257/504* (2013.01); *B01D 2259/4566* (2013.01); *F25D 2317/04* (2013.01)

(58) Field of Classification Search
CPC .... B01D 2259/40088; B01D 2253/102; B01D 53/0446; B01D 53/0462; B01D 53/0407; B01D 53/02; A23B 7/148; B65D 88/74; F25D 17/042; F25D 2317/04; Y02C 20/40; B60H 1/32
See application file for complete search history.

(56) References Cited

U.S. PATENT DOCUMENTS

| | | | | |
|---|---|---|---|---|
| 5,333,394 | A | * 8/1994 | Herdeman | A23B 7/148 |
| | | | | 34/218 |
| 5,623,105 | A | 4/1997 | Liston et al. | |
| 5,872,721 | A | * 2/1999 | Huston | A23B 7/148 |
| | | | | 702/24 |
| 7,089,751 | B2 | * 8/2006 | Fleming, Jr. | F25D 17/042 |
| | | | | 62/78 |
| 2013/0178145 | A1 | * 7/2013 | Gomez | A23L 3/3418 |
| | | | | 454/239 |
| 2013/0291722 | A1 | * 11/2013 | Stallman | F23J 15/006 |
| | | | | 95/134 |
| 2014/0137598 | A1 | * 5/2014 | Fleming, Jr. | F25D 17/042 |
| | | | | 62/617 |
| 2014/0216261 | A1 | * 8/2014 | Fleming, Jr. | B01D 53/0454 |
| | | | | 96/124 |

\* cited by examiner

SCRUBBER APPARATUS FOR A REFRIGERATED TRANSPORT CONTAINER

BACKGROUND

The disclosure relates to a scrubber apparatus for a refrigerated transport container and a method of operating a refrigerated transport container.

Refrigerated transport containers are used to transport cargo within a refrigerated atmosphere inside the container. Such cargo may typically comprise foodstuffs, particularly fresh produce such as fruit and vegetables. It is known to prolong the shelf life of fresh produce by refrigeration. It has also been proposed that the shelf life of some commodities may be extended by storing fresh produce in an environment with a modified (relative ambient air) or controlled quantity of component gases, for example a relatively low concentration of carbon dioxide. Fresh produce in storage tends to consume oxygen and produce carbon dioxide as a waste product, such that without ventilation, a concentration of carbon dioxide would increase and a concentration of oxygen would be reduced.

It has been proposed to provide a carbon dioxide scrubber such as a regenerating adsorbent bed of active charcoal to remove excess carbon dioxide from the atmosphere inside the container.

SUMMARY

According to a first aspect there is provided a scrubber apparatus for a refrigerated transport container having a cargo space, the scrubber apparatus comprising: a regenerating adsorber configured to permit flow therethrough for adsorption or desorption of a controlled gas; a manifold in fluid communication with a first side of the adsorber, comprising: an interior gas port for fluid communication with interior gas in the cargo space; and an exterior gas port for fluid communication with exterior gas outside of the cargo space; an adsorption control damper at the interior gas port for controlling selective fluid communication between the adsorber and interior gas; and a regeneration control damper at the exterior gas port for controlling selective fluid communication between the adsorber and exterior gas; and a common actuator configured to actuate both the adsorption control damper and the regeneration control damper to move between an adsorption configuration, in which the adsorption control damper is open to permit an interior gas flow through the adsorber and the regeneration control damper is closed, and a regeneration configuration, in which the regeneration control damper is open to permit an exterior gas flow through the adsorber and the adsorption control damper is closed.

A controlled gas may be a component gas of interior gas, for example carbon dioxide or ethylene, or any other component gas which may be removed by a suitable scrubber apparatus. Each one of the adsorption control damper and the regeneration control damper may be biased to a respective bias position which is either an open position or a closed position of the respective damper.

The common actuator may comprise a rotatable common actuation element configured to rotate in a first direction to move the adsorption control damper away from its bias position and to rotate in an opposing second direction to move the regeneration control damper away from its bias position.

The bias position of each damper may be a closed position of the respective damper, and the common actuation element may be configured to move in the first direction to open the adsorption control damper and to move in the second direction to open the regeneration control damper. Alternatively, the bias position may be an open position and the common actuation element may be configured to move in the first direction to close the adsorption control damper and to move in the second direction to close the regeneration control damper.

The manifold and the adsorber may be provided in a housing. The air dampers may be provided within the housing.

The apparatus may comprise an air mover between the manifold and the adsorber (and which may be upstream or downstream of the adsorber). The air mover may be within the housing. Alternatively, the air mover may be provided within a duct outside the housing and coupled to the housing so as to be supported on the housing.

The housing may have a layered structure such that the adsorber is provided in an adsorber layer and the manifold is provided in air control layer superposed on the adsorber layer for switching between the adsorption configuration and the regeneration configuration.

The apparatus may further comprise a heater disposed upstream of the adsorber and downstream of the manifold. In examples where the manifold and adsorber are provided within a housing, the heater may be disposed within the housing. Alternatively the heater may be provided within a duct outside the housing and coupled to the housing so as to be supported on the housing.

The apparatus may further comprise a heater controller. The heater controller may be configured to heat interior gas upstream of the adsorber in the adsorption configuration.

The heater controller may be configured to operate the heater in a first mode to heat interior gas when the apparatus is in the adsorption configuration, and to operate the heater in a different second mode to heat exterior gas when the apparatus is in the regeneration configuration.

The heater controller may be configured to control the heater to raise the temperature of the interior gas by a threshold increase. In other words, the controller may be configured to operate the heater (i.e. in a first mode) to maintain a substantially constant power or heat input of the heater despite variations in the temperature of the interior gas upstream of the heater. In examples where the flow rate of interior gas is variable, the heater controller may be configured to operate the heater to maintain a substantially constant heat input to the interior gas per unit flow (e.g. per unit mass or volume). Accordingly, the heater power may be varied in the first mode dependent on a parameter indicative of flow rate, for example as a function of an operating parameter of an air mover which drives the interior gas flow through the scrubber apparatus, or as a function of an output of a flow meter configured to monitor the interior gas flow.

By raising the temperature of the interior gas, the relative humidity of the interior gas may be reduced, which may inhibit condensation of the interior gas as it flows through the adsorber. For example, interior gas received from the cargo space at a temperature of between 0° C.-20° C. may be heated so as to rise in temperature by between 2° C.-10° C. By way of example, such heating may reduce relative humidity of air as interior gas significantly, for example from 90% to 60%. Condensation of gas in the adsorber may inhibit performance of the adsorber. Such an effect may be achieved without monitoring of the temperature of the interior gas to achieve a particular temperature increase or absolute temperature. For example, the application of a constant heat input (i.e. a constant rate of heating) to the interior gas would cause the temperature of the interior gas to rise.

In other examples, the heater controller may be configured to operate the heater (i.e. in a first mode) to vary heat input to the interior gas flow based on monitoring a temperature of the interior gas. A temperature upstream of the heater or downstream of the heater may be monitored. The scrubber apparatus may comprise a temperature sensor to monitor a temperature of exterior gas upstream or downstream of the heater. The heater controller may be configured to operate the heater based on an output of the temperature sensor. Such monitoring may be done to control the heater to heat the interior or exterior gas by a threshold temperature rise.

In further examples, the heater controller may be configured to heat the interior gas (i.e. in a first mode) and/or exterior gas (i.e. in a second mode) in respective configurations of the scrubber apparatus to a respective threshold temperature (i.e. to an absolute temperature, rather than to raise the temperature by a threshold amount). The heater controller may be configured to heat the exterior gas flow and/or the interior gas flow in respective configurations to a respective target downstream temperature for supply to the adsorber. In other words, the controller may be configured to control the power of the heater in either of the first or second modes, to compensate for variations in the temperature of the respective gas upstream of the heater. Such control may be based on monitoring the temperature of the gas upstream of the heater, or may be based on monitoring the temperature of the heated gas (i.e. downstream of the heater) using a feedback loop.

By way of example, the heater controller may be configured to operate the heater in a first mode to heat interior gas having an upstream temperature in a first temperature range to a target downstream temperature, and to heat interior gas having an upstream temperature in a second temperature range by a constant heat input or to raise the temperature by a threshold increase (i.e. by a constant amount). For example the heater controller may be configured to heat interior gas which is below a minimum threshold (such as −5° C. or 0° C.) to a higher minimum temperature, such as 0° C. or 5° C. The heater controller may be configured to cause a constant temperature increase (for example 2° C., or 5° C., or 10° C.) or to provide a corresponding constant heat input to interior gas which is within a control temperature range. For example, interior gas which is within a control range of between −5° C. to 20° C. upstream of the heater may be heated by a constant heat input or to cause a constant temperature increase. A lower temperature boundary of the control range may correspond to a minimum threshold as described above. The controller may be configured to apply a relatively lower constant heat input or no heat input to interior gas having an upstream temperature above a maximum threshold upstream of the heater, for example 20° C.

In some examples, the heater controller may operate the heater in a second mode to heat exterior gas to a threshold desorption temperature corresponding to operation of the adsorber to desorb a controlled gas previously adsorbed to the exterior gas. For example, the heater controller may control the heater to cause the exterior gas to be heated to an elevated temperature relative operation of the heater in the adsorption configuration. For example the heater controller may control the heater to heat the exterior gas to an elevated temperature of at least 40° C., at least 50° C., at least 60° C., at least 70° C., at least 80° or higher in the regeneration configuration.

The scrubber apparatus may be configured for unidirectional flow through the adsorber (i.e. flow in the same direction in both the adsorption configuration and the regeneration configuration), or bidirectional flow through the adsorber (i.e. flow in one direction in the adsorption configuration and in an opposing direction in the regeneration configuration). When the apparatus is configured for unidirectional flow, the interior gas port and the exterior gas port are either both configured to provide flow to the adsorber, or both configured to receive flow from the adsorber. When the apparatus is configured for bidirectional flow, the interior gas port and the exterior gas port at the manifold may be configured to convey respective flows in different directions through the adsorber (i.e. one may provide flow to the adsorber and one may receive flow from the adsorber).

The manifold may be one of two such manifolds at opposing sides of the adsorber.

A first one of the manifolds may be an inlet manifold, and the respective interior gas port may be configured to provide an interior gas flow from the cargo space to the manifold, and the respective exterior gas port may be configured to provide an exterior gas flow from outside the cargo space to the manifold. A second one of the manifolds may be an outlet manifold, and the respective interior gas port may be configured to discharge an interior gas flow from the manifold (i.e. downstream of the adsorber) to the cargo space, and the respective exterior gas port may be configured to discharge an exterior gas flow from the manifold outside of the cargo space.

In examples where the scrubber apparatus comprises a heater, the heater may be disposed downstream of the inlet manifold and upstream of the adsorber.

The common actuator may be configured to actuate the adsorption control dampers and the regeneration control dampers at each manifold to move between the adsorption configuration and the regeneration configuration.

There may be a mechanical linkage between actuation elements at each manifold, or between each actuation element and a common drive, such that the actuation elements move in unison.

According to a second aspect there is provided a scrubber apparatus for a refrigerated transport container having a cargo space, the scrubber apparatus comprising: a regenerating adsorber configured to permit flow therethrough for adsorption or desorption of a controlled gas; an air damper module configured to switch the apparatus between an adsorption configuration in which the adsorber is to receive interior gas from the cargo space and discharge treated interior gas to the cargo space; and a regeneration configuration in which the adsorber is to receive exterior gas from outside of the cargo space and discharge enriched exterior gas (i.e. enriched by desorption of a previously-adsorbed controlled gas to the exterior gas); a heater configured to heat gas provided to the adsorber; and a heater controller configured to operate the heater to heat interior gas provided to the adsorber when the air damper module is in the adsorption configuration. The term "treated" in this context is intended to indicate that the interior gas has passed through the adsorber so that the controlled gas at least partly adsorbed from it, such that it has been treated. The term "enriched" in this context is intended to indicate that the exterior gas has passed through the adsorber where the controlled gas is at least partly desorbed to the exterior gas, such that the exterior gas is enriched with the controlled gas as compared to exterior gas as received in the scrubber apparatus.

The heater controller may be configured to operate the heater in a first mode to heat interior gas when the apparatus is in the adsorption configuration, and to operate the heater in a second mode to heat exterior gas when the apparatus is in the regeneration configuration.

The heater controller may have any of the features of configuration or operation as described above with respect to the first aspect.

The apparatus according to the second aspect may have any features described with respect to other aspects herein.

According to a third aspect there is provided a refrigerated transport container or a refrigeration system for a refrigerated transport container, comprising: an evaporator heat exchanger for receiving a return flow of interior gas from a cargo space for cooling; and a scrubber apparatus in accordance with the first or second aspect; wherein the scrubber apparatus is configured to receive a portion of a return flow of interior gas for removal of a controlled gas from upstream of the evaporator heat exchanger with respect to the direction of return flow, and is configured to discharge treated interior gas having passed through the adsorber at a position downstream of the evaporator.

According to a fourth aspect there is provided a method of operating a scrubber apparatus in accordance with the first aspect (or of operating a refrigeration module or refrigerated transport container comprising a scrubber apparatus in accordance with the first aspect), the method comprising operating the common actuator to move both the adsorption control damper and the regeneration control damper between the adsorption configuration and the regeneration configuration.

The method may comprise operating the air mover in the adsorption configuration and/or the regeneration configuration to cause a flow of interior or exterior gas respectively to flow through the scrubber apparatus.

The method may comprise the heater controller operating the heater in a first mode to heat interior gas when the apparatus is in the adsorption configuration. The method may comprise the heater controller operating the heater in a second mode to heat exterior gas when the apparatus is in the regeneration configuration.

The method may comprise, in response to determining that a level of a controlled gas in the cargo space is at or above a maximum threshold: a controller causing the air dampers to move to the adsorption configuration; and/or a controller activating the air mover to cause a flow of interior gas to flow through the apparatus and the adsorber; and/or a heater controller operating the heater in a first mode to heat interior gas.

The method may comprise, in response to determining that a level of a controlled gas in the cargo space is below a minimum threshold: a controller causing the air dampers to move to a neutral configuration or the regeneration configuration. When the controller causes the air dampers to move to the neutral configuration, the controller may deactivate the air mover; and/or deactivate the heater.

The method may comprise, in response to determining a criteria for regeneration, a controller causing the air dampers to move to the regeneration configuration; and/or a controller activating the air mover to cause a flow of exterior gas to flow through the apparatus and the adsorber; and/or a heater controller operating the heater in a second mode to heat exterior gas.

The method may comprise the scrubber apparatus, in the adsorption configuration, receiving a flow of interior gas from the cargo space from return flow upstream of an evaporator heat exchanger with respect to a direction of return flow, and discharging treated interior gas having passed through the adsorber at a position downstream of the evaporator.

According to a fifth aspect there is provided a method of operating a scrubber apparatus according to the second aspect (or of operating a refrigeration module or a refrigerated transport container comprising a scrubber apparatus according to the second aspect), the method comprising causing a flow of interior gas through the adsorber in the adsorption configuration; and heating the interior gas provided to the adsorber.

The method may comprise the scrubber apparatus, in the adsorption configuration, receiving a flow of interior gas from the cargo space from return flow upstream of an evaporator heat exchanger with respect to a direction of return flow, and discharging treated interior gas having passed through the adsorber at a position downstream of the evaporator.

The method according to the fifth aspect may comprise any feature of operation or control as described with respect to other aspects herein.

BRIEF DESCRIPTION OF THE DRAWINGS

The invention will now be described, by way of example only, with reference to the accompanying drawings, in which.

DETAILED DESCRIPTION

Figure 1:
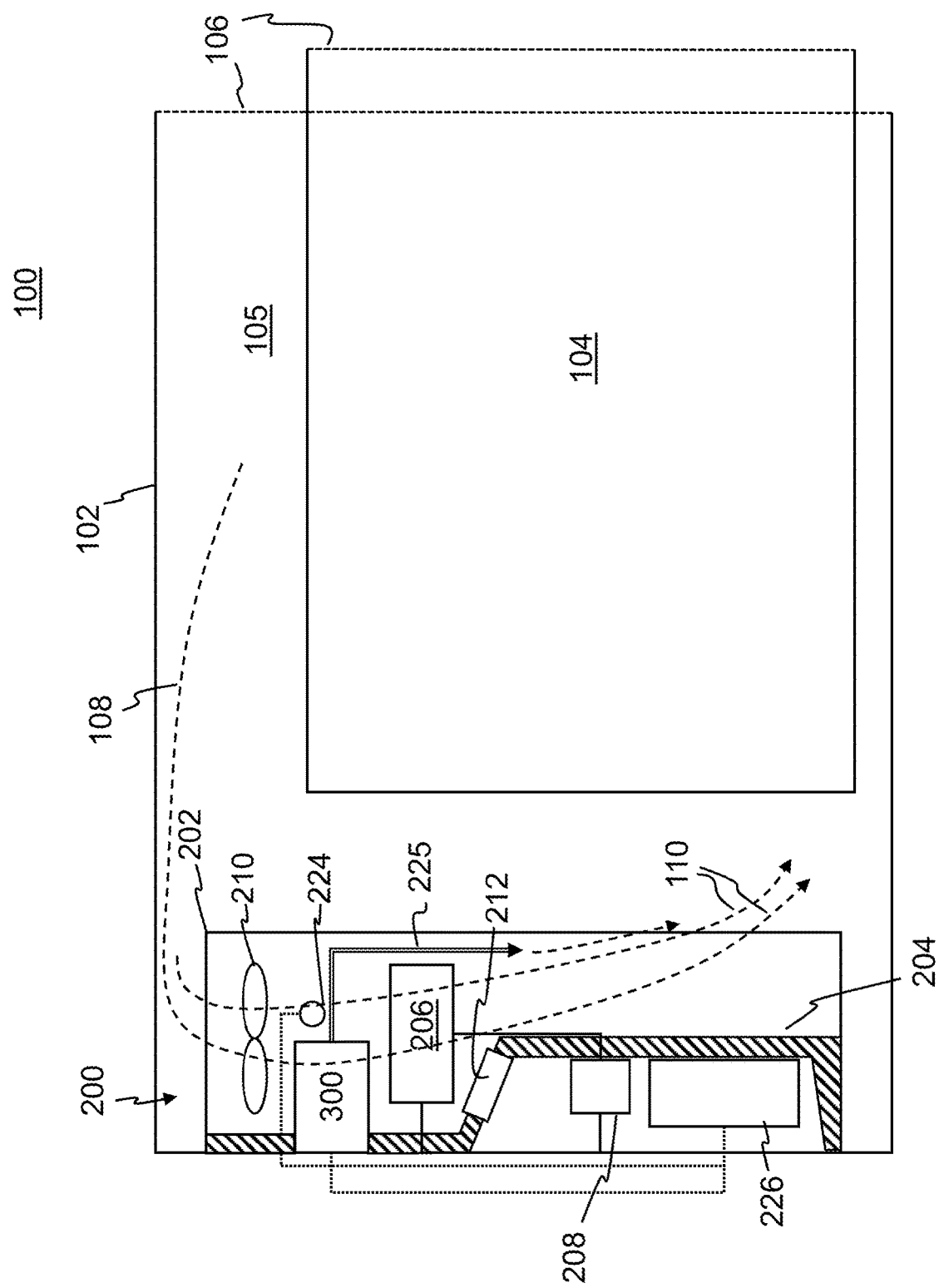
FIG. 1 is a partial schematic cut-away side view of an example refrigerated transport container including a scrubber apparatus.

FIG. 1 schematically shows a transport container 100 comprising external walls 102 which separate an internal atmosphere of interior gas from an external atmosphere of exterior gas. By way of example, cargo 104 is provided in a cargo space 105 of the container, such as a load of fresh fruit and vegetables. FIG. 1 is a partial view showing a first end of the container which comprises a refrigeration module 200. An end of the container and of the cargo 104 away from the first end of the container is not shown for simplification of the drawing, as indicated by continuation lines 106.

The refrigeration module 200 is installed in the transport container to provide a refrigerated transport container. The refrigeration module 200 is generally provided at one end of the container adjacent a wall 102 of the transport container 100.

The refrigeration module 200 comprises a structural frame 202 which is within the container when installed in the container 100, and is open so as to permit a flow of return air 108 to be directed to components of the refrigeration module 200 as will be described below, and to deliver a flow of supply air 110 to the cargo space.

The refrigeration module 200 comprises an external wall 204 which may serve as an external wall of the transport container 100 separating the internal atmosphere of the container from the external atmosphere.

The example refrigeration module 200 comprises a refrigeration circuit including an evaporator 206 disposed on an inside of the external wall 204 and a condenser 208 disposed outside of the external wall 204. The refrigeration circuit may include a compressor, an expansion valve and flow lines connecting the components of the circuit as is known in the art so that in use the evaporator is configured to transfer heat from interior gas to the circulating refrigerant, and the condenser is configured to transfer heat from the refrigerant to exterior gas.

In this example an evaporator fan 210 is provided to direct a flow of return air 108 over the evaporator 206 to be cooled, and to then be directed to the cargo space as supply air 110. In this particular example, the refrigeration module is configured so that the return air flows downward through the refrigeration module, and the evaporator fan 210 is disposed upstream and therefore generally above the evaporator 206. However, in other examples the evaporator fan 210 may be disposed upstream or downstream relative the evaporator, and the particular orientation and direction of the flow therethrough may be different.

The refrigeration module further comprises a scrubber apparatus 300, a gas sensor 224 for monitoring a parameter relating to the composition of interior gas, and a controller 226. As shown in FIG. 1, in this example the controller 226 is disposed outside of the external wall 204 of the refrigeration module, whereas the scrubber apparatus 300 and the gas sensor 224 are disposed inside of the external wall 204.

In this particular example, the scrubber apparatus 300 and the gas sensor 224 are disposed between the evaporator fan 210 and the evaporator 206 so that the evaporator fan 210 is configured to direct a flow of return air 108 towards the scrubber apparatus and past the sensor 224. However, other relative positions may be adopted in other examples, and a flow of return air may be conveyed through the scrubber apparatus by an integrated air mover of the apparatus 300 or an air mover upstream or downstream of the apparatus.

As shown in FIG. 1, the refrigeration module 200 further comprises a fresh air vent 212 which is configured to selectively open and close to permit a flow of fresh air into the cargo space 105 as is known in the art.

Figure 2:
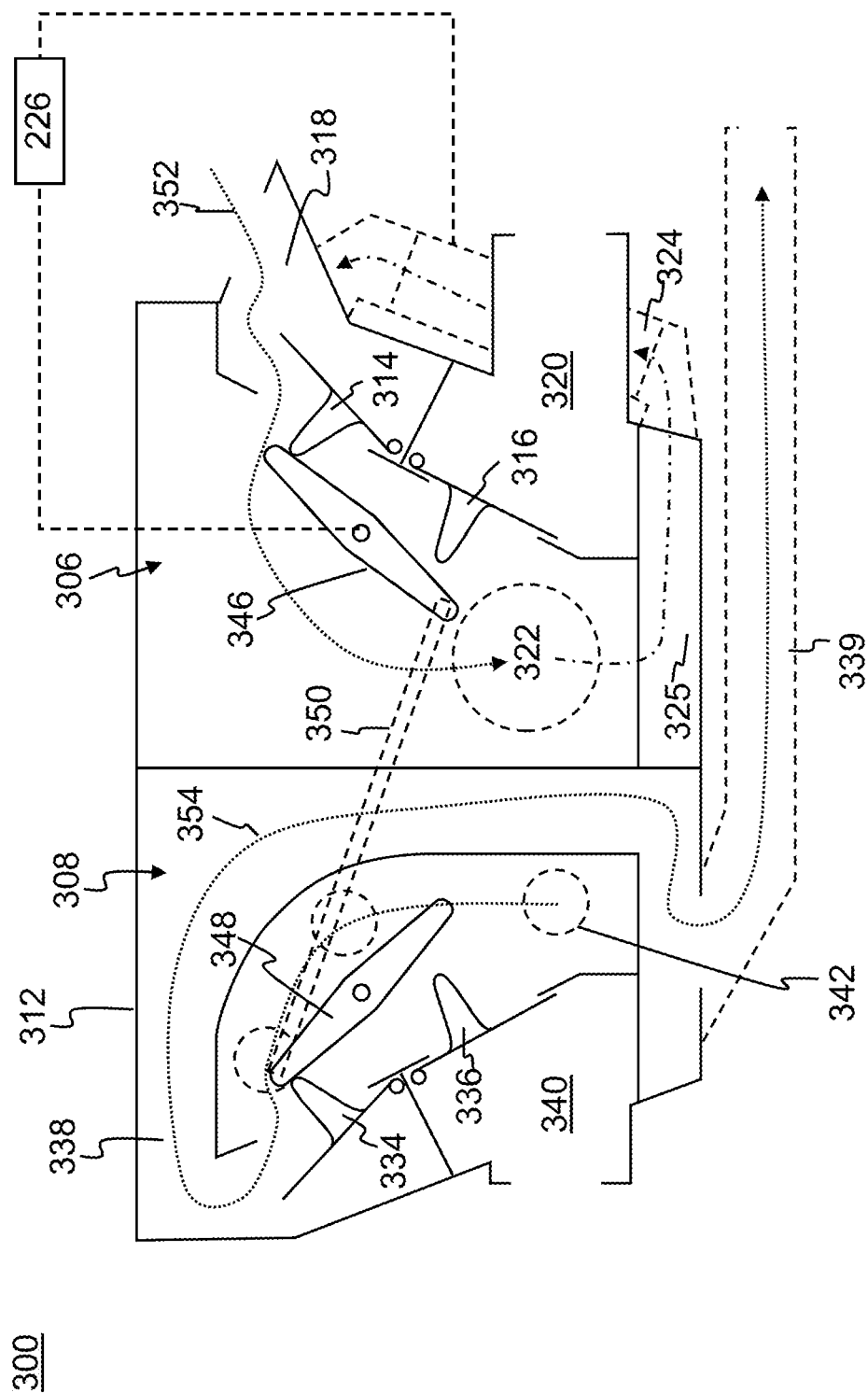
FIG. 2 is a simplified cross-sectional view of an example scrubber apparatus in an adsorption configuration
Figure 3:
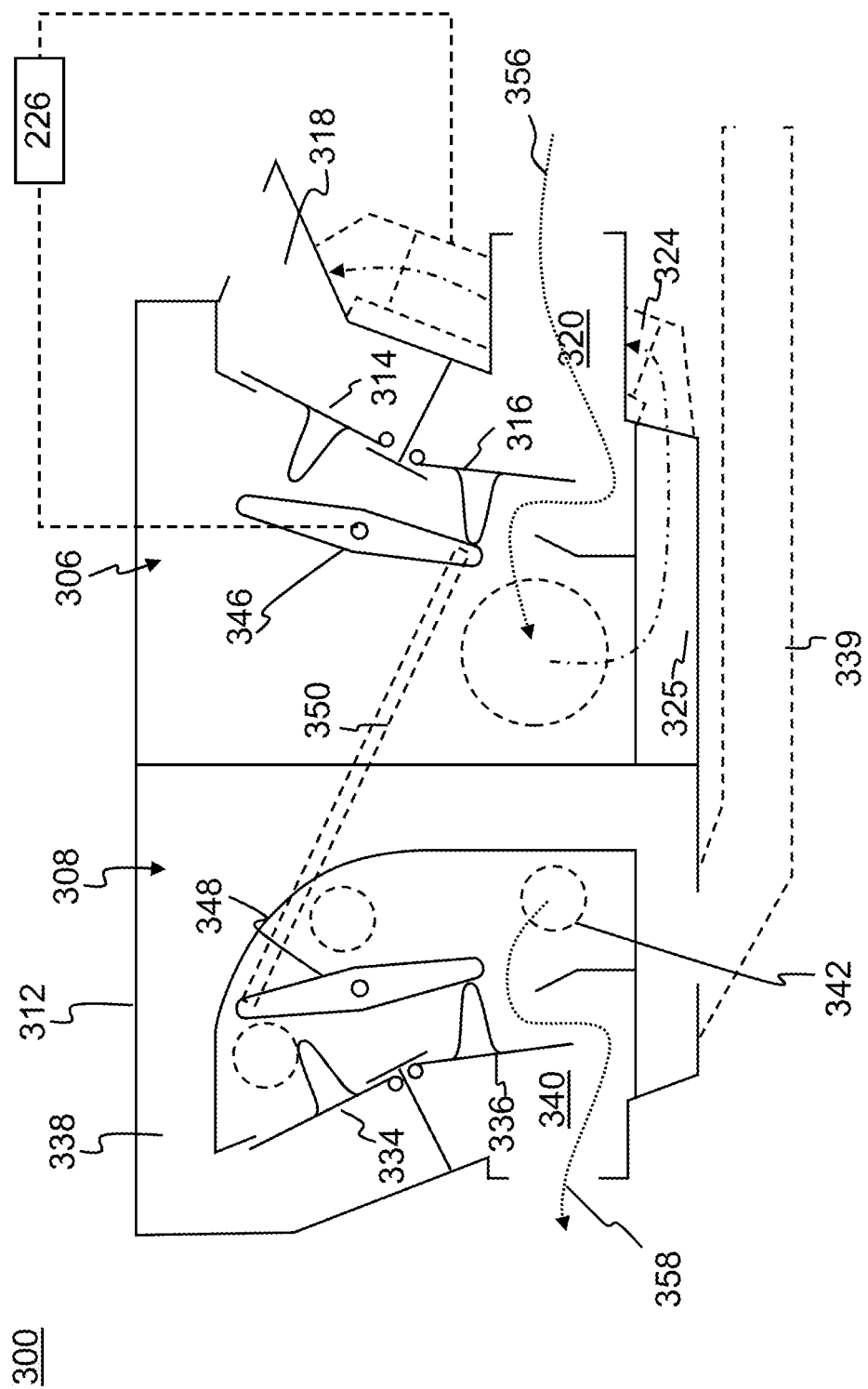
FIG. 3 is a simplified cross-sectional view of the scrubber apparatus of FIG. 2 in a regeneration configuration

FIGS. 2 and 3 schematically show the scrubber apparatus 300 in a cross-sectional view through inlet and outlet manifolds of the apparatus, in isolation from the refrigerated transport container of FIG. 1. The cross-sectional view of FIGS. 2 and 3 may be considered a frontal view of the apparatus. In FIG. 2 the apparatus 300 is in an adsorption configuration in which a flow of interior gas from the cargo space is conveyed through an adsorber for adsorption of a controlled gas from the interior gas, whereas in FIG. 3 the apparatus 300 is in a regeneration configuration in which a flow of exterior gas from outside the cargo space (e.g. ambient air) is conveyed through the adsorber for desorption of the controlled gas to the exterior gas to regenerate the adsorber, both of which are described in further detail below. FIGS. 2 and 3 show the controller 226, which may be considered at least functionally part of the scrubber apparatus. In some examples, the controller 226, or a further controller implementing at least the functions of control of the apparatus 300 described below, may be integrally provided with the scrubber apparatus.

Figure 4:
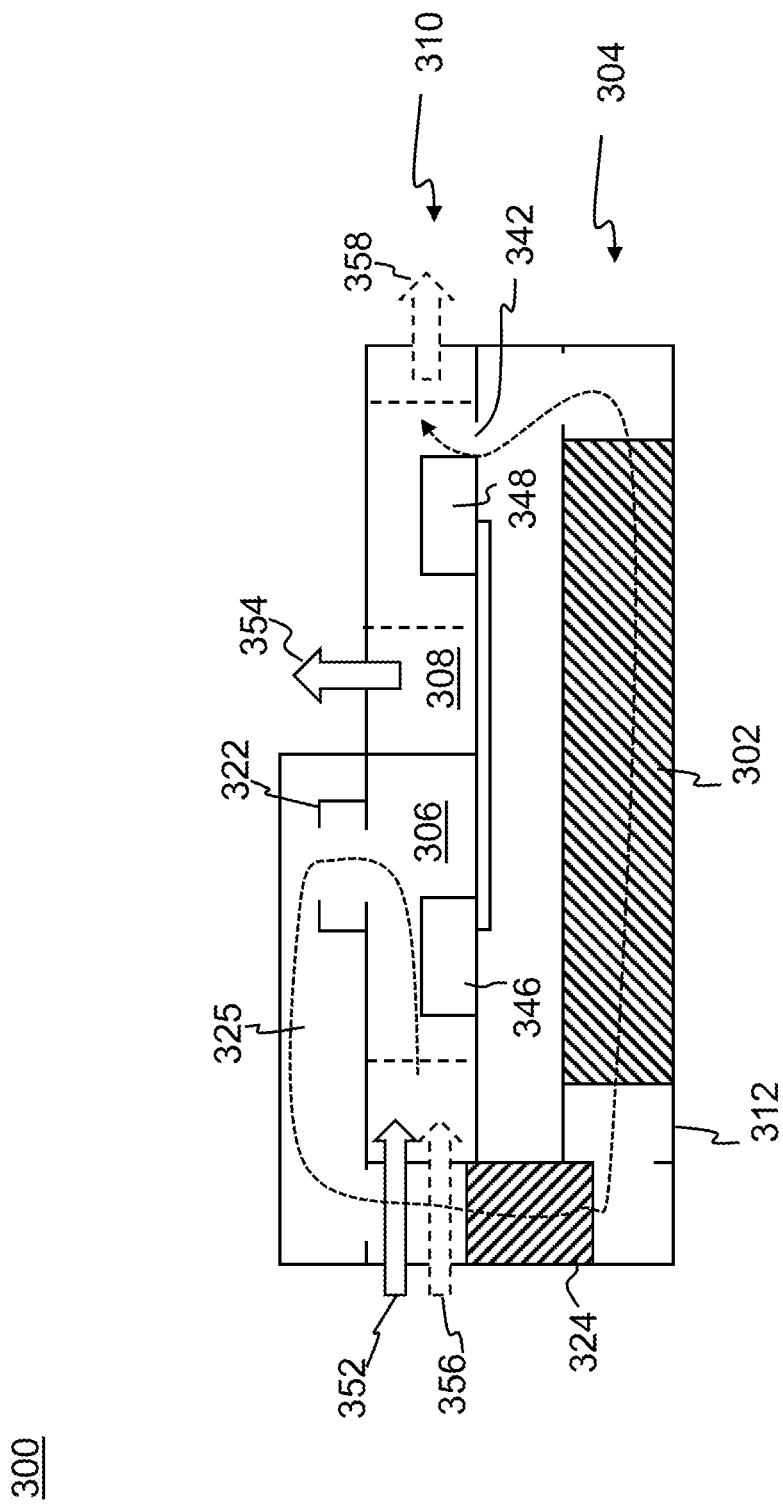
FIG. 4 is a simplified cross-sectional view of the scrubber apparatus of FIGS. 2 and 3 from a different orientation showing a cross section through layers of the apparatus.
Figure 5:
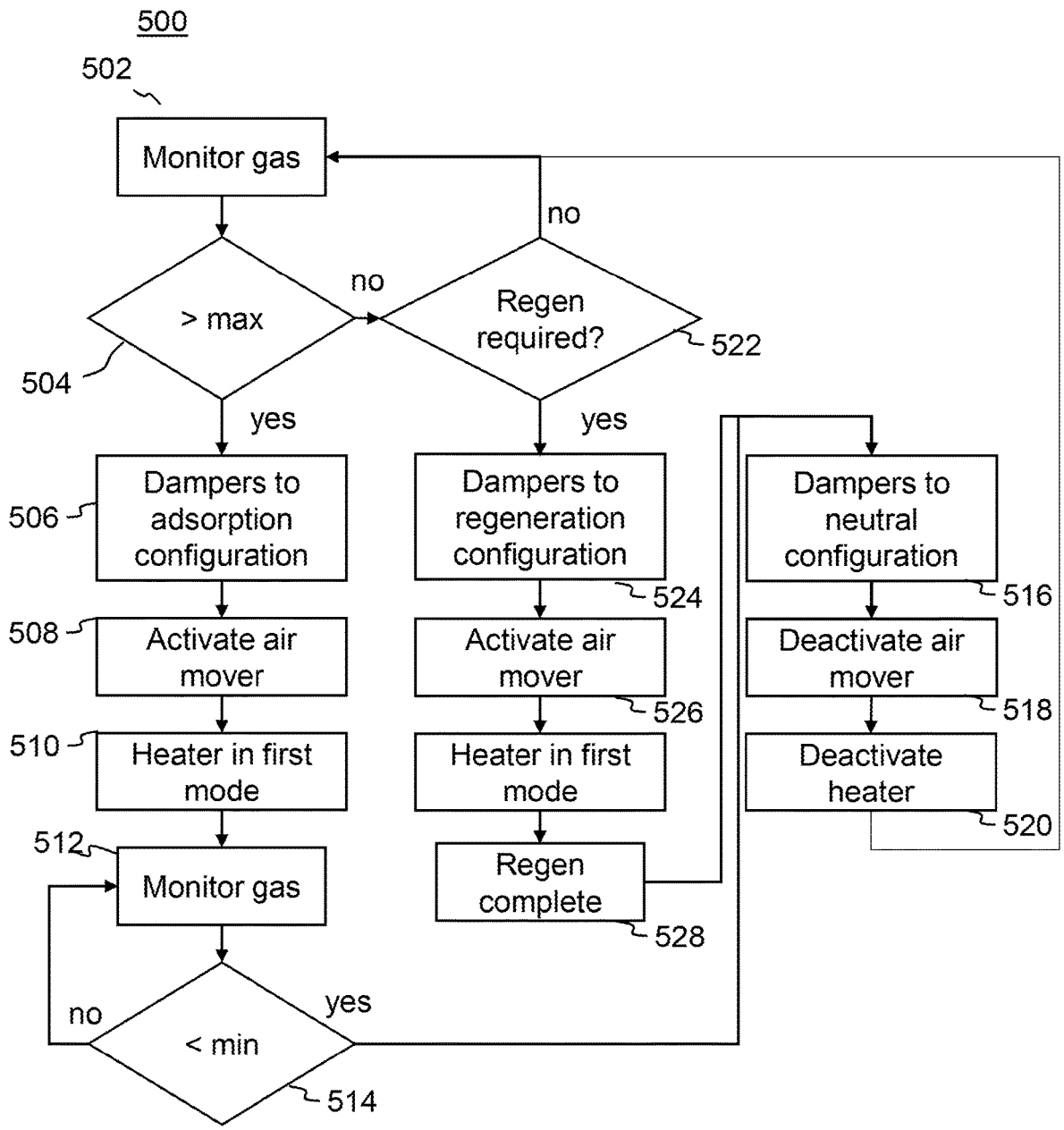
FIG. 5 is a flow diagram of an example method of operating a scrubber apparatus.

FIG. 4 schematically shows the scrubber apparatus 300 of FIGS. 2-3 in a different cross-sectional view which may be considered a top view of the apparatus. As shown in FIG. 4, in this example the apparatus 300 is generally configured in a layered structure such that the adsorber 302 is provided in an adsorber layer 304, and inlet and outlet manifolds 306, 308 for the adsorber 302 are provided in an air control layer 310 superposed on the adsorber layer 304. The manifolds 306, 308 and the adsorber are provided in a common housing 312, which may serve to at least partly define walls of air conveying structures such as the manifolds 306, 308 so as to provide a compact configuration.

Referring again to FIG. 2, in this example the scrubber apparatus comprises an inlet manifold 306 and an outlet manifold 308 provided on right and left sides of the air control layer respectively (as shown in FIG. 2) within the housing 312. In this example, each of the manifolds 306, 308 is partly defined by walls of the housing 312 and a partition wall between the manifolds. The inlet manifold 306 comprises a common chamber defined between rear and front walls of the air control layer, the partition between the manifolds, an upper wall of the housing 312 and a port wall which defines two openings provided with respective air dampers 314, 316 for selectively closing the openings. The inlet manifold 306 comprises an inlet interior gas port 318 extending into the housing from a side of the housing and terminating at the port wall and a respective one of the air dampers, in particular at an inlet adsorption control damper 314 which is openable and closeable to respectively permit and prevent an inlet flow of interior gas to the manifold from the cargo space. The inlet interior gas port 318 is configured to receive a flow of interior gas from the cargo space for removal of a controlled gas at the adsorber from the interior gas. The inlet manifold 306 further comprises an inlet exterior gas port 320 extending into the housing 312 from a side of the housing and terminating at the port wall and a respective one of the air dampers, in particular at an inlet regenerating control damper 316 which is openable and closeable to respectively permit and prevent an inlet flow of exterior gas to the manifold through the inlet exterior gas port from outside the cargo space. The inlet exterior gas port 320 is configured to receive a flow of exterior gas (e.g. ambient air) from outside the cargo space for desorption of the controlled gas from the adsorber.

The common chamber of the inlet manifold 306 is in fluid communication with the adsorber to provide flow to the adsorber, and the term "common" is used in this context to indicate that the same chamber is configured to convey flow between the adsorber and each one of the respective interior and exterior gas ports. In this particular example, the inlet manifold 306 is in fluid communication with the adsorber via an air mover 322 and a heater duct comprising a heater 324. The air mover 322 is shown in dashed lines in FIG. 2 as in this example it is located forward of the cross-sectional plane of the drawing. The pathway from the inlet manifold to the adsorber 302 is best shown by FIG. 2 in combination with FIG. 4, which shows a pathway from the inlet manifold 306 through the air mover 322 (disposed forward of the manifold 306) which extends laterally along a heater inlet duct 325 to a heater 324 disposed in a duct mounted on a side of the housing. A further duct conveys gas from the heater 324 to the adsorber 302 in the adsorber layer 304 of the apparatus 300.

Referring again to FIG. 2, the outlet manifold 308 is similarly arranged relative the inlet manifold 306. It comprises a common chamber between rear and front walls of the air control layer; a curved guide wall of an outlet exterior gas port (as will be described below) which is spaced apart from the partition wall between the manifolds and the upper wall of the housing; and a port wall which defines two openings provided with respective air dampers 334, 336 for selectively closing the openings. The outlet manifold 308 comprises an outlet interior gas port 338 extending into the housing. In this example, the outlet interior gas port 338 extends into the housing along a circuitous path. In particular, there is an outlet discharge duct 339 extending from a lower wall of the housing for discharging treated interior gas (as will be described below). The outlet interior gas port 338 extends into the housing from the lower wall and around a scroll-like or C-shaped pathway between the curved guide wall and the partition between the manifolds, and between the guide wall and the upper wall of the housing. The outlet interior gas port 338 terminates at the port wall and a respective one of the air dampers, in particular at an outlet adsorption control damper 334 which is openable and closeable to respectively permit and prevent an outlet flow of treated interior gas from the manifold to the cargo space via the outlet interior gas port and the outlet discharge duct 339. The outlet manifold 308 further comprises an outlet exterior gas port 340 extending into the housing 312 from a side of the housing (in particular, the side opposite the inlet exterior gas port 320) and terminating at the port wall and a respective one of the air dampers, in particular at an outlet regenerating control damper 336 which is openable and closeable to respectively permit and prevent an outlet flow of exterior gas from the manifold through the outlet exterior gas to be discharged outside the cargo space. The outlet exterior gas port 340 is configured to receive a flow of enriched exterior gas from the manifold (i.e. downstream of the adsorber) and discharge it outside the cargo space. The exterior gas is enriched owing to desorption of the controlled gas from the adsorber to the exterior gas.

The common chamber of the outlet manifold 308 is in fluid communication with the adsorber to receive flow from the adsorber. In this particular example, the outlet manifold 308 is in fluid communication with the adsorber via openings 342 in the rear wall of the air control layer, as shown in both FIGS. 2 and 4.

The arrangement of the ports and manifolds represents one particular example of how they may be oriented, and other arrangements may be used in other examples.

Each manifold is provided with a common actuation element 346, 348 which is configured to operate both the respective adsorption control damper 314, 334 and the respective regeneration control damper 316, 336. In this example, each of the air dampers is pivotable to open and close, and is rotationally biased at the pivot to a closed position in which it engages the respective port wall to prevent flow through the respective port. Each air damper comprises a respective actuation projection which extends into the common chamber from a functional member of the air damper (i.e. the member which closes the opening in the port) to engage the common actuation element 346, 348. As shown in FIG. 2, in this example the two air dampers in each respective manifold are collocated so that the respective common actuation element 346 can engage each one. In this example, the common actuation element 346, 348 associated with each manifold 306, 308 is a rotational elongate arm having a central pivot and actuation point about which it rotates. Each common actuation element has a neutral position in which it displaces neither one of the respective air dampers from the respective closed position, such that flow through the respective manifold is prevented. Each common actuation element 346, 348 is configured to rotate in a respective first direction to move the respective adsorption control damper 314, 334 away from its bias position (the closed position, in this example) to an open position and thereby permit an interior gas flow through the respective port such that the manifold is in an adsorption configuration. In this example, as manifolds are provided at both sides of the adsorber, the apparatus 300 is in an adsorption configuration when actuation elements at both manifolds open the respective adsorption control dampers. Each common actuation element 346, 348 is further configured to rotate in a respective second direction to move the respective regeneration control damper 316, 336 away from its bias position (the closed position, in this example) to an open position and thereby permit an exterior gas flow through the respective port such that the manifold is in a regeneration configuration. Again, in this example the apparatus is in a regeneration configuration when actuation elements at both manifolds open the respective regeneration control dampers. The first direction for the actuation element 346 of the inlet manifold may be opposite to the first direction for the actuation element 348 of the outlet manifold, as in the example of FIG. 2 (in which the actuation element 346 for the inlet manifold turns clockwise as oriented in the drawing to open the inlet adsorption control damper, whereas the actuation element 348 of the outlet manifold turns anticlockwise to open the outlet adsorption control damper).

In this example, the actuation element 346 for the inlet manifold 306 is actuated by a motor controlled by the controller 226. By actuating both the adsorption control damper 314 and the regeneration control damper 316 at a respective manifold with one actuator (i.e. the actuation element 346 and the motor to drive it), the number of actuators to operate the scrubber apparatus 300 may be reduced (i.e. as compared with an apparatus in which each flow line to an adsorber is provided with a respective valve).

In this example, the actuation elements 346, 348 associated with the respective manifolds are coupled by a mechanical linkage so that operation (i.e. rotation) of one of the actuation elements causes operation of the other. Accordingly, this further reduces the number of actuators to operate the apparatus 300. In this example, the mechanical linkage comprises a connecting rod 350 coupled to respective rear portions of the actuation elements at eccentric positions with respect to the respective pivot, the rear portions being disposed on the other side of the rear wall of the air control layer from main portions which are disposed within the respective manifold to actuate the air dampers. However, in other examples, the actuation elements may be linked by any suitable linkage. A configuration of air dampers to move between an adsorption configuration and a regeneration configuration may be referred to herein as an air damper module.

Air dampers for selectively permitting and preventing gas flows in a refrigerated transport container may be rated for high flow rates (such as between $3 \times 10^{-4}$ and 0.14 m$^3$/s—roughly 1 to 500 cubic metres per hour), and may require structural supports and actuators of correspondingly high strength to support and operate them, which may be expensive. By collocating air dampers for common actuation by an actuator, the number of actuators and supports for air dampers may be reduced.

The controller 226 is configured to cause the actuation elements to move the air control dampers between the adsorption configuration and the regeneration configuration as will be described in detail below. In this example, the controller 226 is also configured to serve as a flow controller which controls activation and deactivation of the air mover 322 (which may be a fan), and is configured to serve as a heater controller to control operation of the heater 324. In other examples, a flow controller and/or a heater controller may be provided separately for controlling these functions.

FIG. 3 shows the apparatus 300 with the actuation elements rotated in the respective second directions (relative FIG. 2) to put the apparatus in the regeneration configuration. In the regeneration configuration, the inlet regeneration control damper 316 is open to permit a flow of exterior gas to be received from outside the cargo space through the inlet exterior gas port 320 and provided to the adsorber; and the outlet regeneration control damper 336 is open to permit enriched exterior gas received from the adsorber to be discharged from the outlet manifold through the outlet exterior gas port 340.

The scrubber apparatus 300 may be configured to adsorb and desorb a controlled gas by appropriate selection of an adsorbent material. For example, the scrubber apparatus 300 may be configured for carbon dioxide removal (i.e. removal from interior gas), or for ethylene removal.

An example method 500 of controlling the scrubber apparatus of FIGS. 1-4 apparatus as installed in the refrigeration unit 200 and refrigerated transport container 100 of FIG. 1 will now be described, by way of example. In this particular example, the scrubber apparatus is configured for removal of carbon dioxide from interior gas, and may therefore be referred to as a carbon dioxide removal apparatus. However, in other examples the scrubber apparatus may be configured for removal of other a different component gas.

In operation of the refrigerated transport container, the refrigeration circuit is operated to maintain the interior gas at a predetermined temperature. In block 502, the controller 226 obtains an output signal from the gas sensor 224 to monitor a parameter relating to the composition of the interior gas, for example a proportion by volume or a partial pressure of carbon dioxide. In this example, the parameter is a concentration of carbon dioxide by volume, which may be monitored using a gas sensor such as a NDIR (nondispersive infrared) sensor configured to monitor a parameter relating to a quantity of a component gas, such as carbon dioxide. Such monitoring may be periodic, for example occurring once every five minutes or less.

In block 504, the controller 226 determines whether the concentration of carbon dioxide is above a threshold which will be referred to as CO2 max, for example a threshold corresponding to 5% carbon dioxide by volume. If the carbon dioxide concentration is below the threshold, the method proceeds to block 522 as will be described below to determine if regeneration of the adsorber is required and to conduct such regeneration if so.

If the carbon dioxide concentration is above the threshold at block 504, the controller 226 operates the carbon dioxide removal apparatus 300 to remove carbon dioxide from return air circulating in the cargo space, as follows.

In block 506, the controller 226 causes the actuator to move the air dampers to the adsorption configuration.

In block 508, the controller 226 also activates the air mover 322 to draw a flow of interior gas through the carbon dioxide removal apparatus 300. However, in other examples interior gas may be caused to flow through the apparatus by a separate air mover, for example by an upstream evaporator fan.

In block 510, the controller 226 (serving as a heater controller) operates the heater 324 to heat the interior gas with the apparatus in the adsorption configuration. By way of example, the controller operates the heater in a first mode in the adsorption configuration to heat the interior gas to raise the temperature of the interior gas by a threshold increase, for example 2° C., or 5° C., or 10° C. The heating may be controlled based on monitoring a temperature of return air upstream of the carbon dioxide removal apparatus, and by monitoring a temperature of interior gas downstream of the heater and upstream of the adsorber (not shown). In other examples, the controller may operate the heater in a first mode to heat the interior gas in a different way, for example to a different threshold increase, to an absolute temperature threshold (i.e. irrespective of the upstream temperature) or to apply a constant heat input to the interior gas. By heating the interior gas, the relative humidity of the interior gas is reduced, which reduces or prevents any condensation of the interior gas at the adsorber. Without wishing to be bound by theory, it is thought that the operating performance of the adsorber is lessened by condensation on the adsorbent material, as it prevents adsorption and desorption of carbon dioxide. However, in other examples, there may be no heating of the interior gas.

With the apparatus in the adsorption configuration, an inlet flow of interior gas 352 (see FIG. 2, and solid arrow in FIG. 4) flows through the inlet interior gas port 318, through the open inlet adsorption control damper 314 to the common chamber of the inlet manifold 306, from where it flows to the air mover 322 and is driven into a heater duct 325. The interior gas flows through the heater 324 where it is heated as will be described below, before flowing through the adsorber 302 where carbon dioxide is adsorbed by the adsorber from the interior gas flow. A reduced carbon dioxide interior gas flows out of the adsorber 302 and to the common chamber of the outlet manifold 308. From the common chamber, the reduced carbon dioxide interior gas flows 354 through the open outlet adsorption control damper 334 and around the guide of the outlet interior gas port 338 to the outlet discharge duct 339.

Referring back to FIG. 1, the outlet discharge duct 339 discharges the reduced carbon dioxide interior gas downstream of the evaporator 206, despite the carbon dioxide removal apparatus receiving the inlet interior gas from a position upstream of the evaporator 206. It may be desirable to maintain substantially steady state or slowly varying temperature conditions of supply air over the evaporator. For example, the refrigeration circuit may have an optimum operating configuration in which heat exchange from the return air to the refrigerant in the evaporator 206 causes phase change of the refrigerant only (i.e. without "specific heating" or temperature rise of the refrigerant"). As described herein, the carbon dioxide removal apparatus may be operated in the adsorption configuration intermittently. The heated reduced carbon dioxide interior gas is discharged at higher temperature than the bulk return air. Accordingly, by discharging the heated reduced carbon dioxide interior gas downstream of the evaporator 206, intermittent variation of the temperature of interior gas flowing over the evaporator 206 is avoided. Instead, the interior gas mixes with the supply air discharged by the refrigeration module 200 into the cargo space and is dissipated. By way of example, the volumetric flow rate of interior gas through the carbon dioxide removal apparatus in the adsorption configuration may be between 1% and 30% of the volumetric flow rate of interior gas recirculating through the refrigeration module 200 as return air, depending on the particular operating mode of the evaporator fan and the carbon dioxide removal apparatus.

In block 512, the concentration of carbon dioxide in return air is again monitored using the gas sensor 224, for example as part of the periodic monitoring described above with reference to block 502. If the concentration of carbon dioxide is above a minimum threshold referred to herein as CO2 min, then the method returns to block 512 to continue periodically monitoring the concentration whilst the carbon dioxide removal apparatus 300 continues to operate in the adsorption configuration. If the concentration of carbon dioxide is at or below the minimum threshold CO2 min (for example a threshold corresponding to 4% carbon dioxide by volume), then the method continues to control the apparatus to stop adsorption of carbon dioxide. In other examples the maximum and minimum CO2 thresholds may be higher or lower. It is thought that the shelf life of certain products may be extended by having an elevated CO2 concentration (i.e. relative ambient conditions) such as greater than 10%. Accordingly, thresholds may be selected in dependence on the cargo.

At block 516, the controller 226 controls the actuator to move the air control dampers to the neutral configuration to prevent flow through the carbon dioxide removal apparatus. At block 518, the controller 226 controls the air mover 322 to stop. At block 520, the controller 226 controls the heater to stop heating (e.g. by stopping power supply to the heater). The method returns to block 502 as described above.

A branch of the method corresponding to regeneration of the adsorber will now be described. As mentioned above, at block 504 the controller determines whether the concentration of carbon dioxide is at or above a maximum threshold CO2 max. If the concentration is below the threshold, in this example the method continues to decision block 522 to determine if regeneration of the carbon dioxide removal apparatus is required. The controller evaluates a criterion for determining if regeneration is required. For example, the criterion may be whether a cumulative operational time of the carbon dioxide removal apparatus in the adsorption configuration exceeds a predetermined regeneration threshold. Such a decision block may be implemented elsewhere in the method, for example after stopping carbon dioxide removal by the apparatus (i.e. after blocks 516-520).

In this example, if it is determined that regeneration is not yet required, the method returns to block 502 as described above.

If it is determined that regeneration is required, the controller 226 operates the carbon dioxide removal apparatus to cause a regenerative flow of exterior gas through the adsorber, as follows.

In block 524, the controller 226 controls the actuator to move the air control dampers to the regeneration configuration. In block 526, the controller 226 controls the air mover to cause a flow of exterior gas to be drawn from outside of the cargo space through the carbon dioxide removal apparatus. As the air mover is provided in communication with a manifold for conveying both interior and exterior gas flows, the same air mover can be used for conveying both interior and exterior gas. In block 528, the controller 226 operates the heater to heat the exterior gas upstream of the adsorber 302. In this particular example, the adsorber may desorb carbon dioxide to low CO2 concentration exterior gas more effectively at elevated temperature. In this particular example, the heater is controlled in a second mode in the regeneration configuration to heat the exterior gas to a temperature threshold (i.e. an absolute temperature, rather than a temperature rise) corresponding to operation of the adsorber for desorption of carbon dioxide to the exterior gas. Accordingly, the heater controller may be configured to control and may operate the heater to heat the exterior gas to a different and higher temperature threshold in the regeneration configuration than in the adsorption configuration. For example, the temperature threshold may be at least 40° C., at least 50° C., at least 60°, at least 70°, at least 80° or higher. The threshold may depend on the operating characteristics of the adsorbent material selected for use.

With the carbon dioxide removal apparatus 300 in the regeneration configuration, an inlet flow of exterior gas 356 (see FIG. 3, dashed arrow in FIG. 4) flows through the inlet exterior gas port 320, through the open inlet regeneration control damper 316 to the common chamber of the inlet manifold 306, from where it flows to the air mover 322 and is driven into the heater duct 325. The exterior gas flows through the heater 324 where it is heated as described above, before flowing through the adsorber 302 where carbon dioxide is desorbed from the adsorber to the exterior gas flow. An enriched carbon dioxide exterior gas flows out of the adsorber 302 and to the common chamber of the outlet manifold 308. From the common chamber, the enriched carbon dioxide exterior gas flows 358 through the open outlet regeneration control damper 336 and through the outlet exterior gas port 340 to be discharged outside of the cargo space.

In block 528, the controller determines that regeneration is complete, for example after a predetermined period for regeneration has elapsed. The method then continues to block 516 to return the carbon dioxide removal apparatus 300 to a neutral configuration, as described above.

Although an example has been described in which actuation elements for each manifold are mechanically coupled, in other examples there may be no mechanical linkage between them. In yet further examples, a different actuation arrangement can be used, including actuation of each air damper by a separate respective actuator.

Although an example has been described in which an air mover of a scrubber apparatus is located upstream of an adsorber, in other examples an air mover can be provided upstream or downstream of the adsorber. In examples where an apparatus is configured for bidirectional flow through the adsorber (i.e. in different directions in the adsorption configuration and the regeneration configuration), the air mover may be in an upstream position in one configuration, and a downstream position in the other.

Although examples have been described which relate to a scrubber apparatus and a refrigerated transport container, in some examples a refrigeration module may be provided for installation (e.g. by original manufacture or retrofit) into a transport container to provide a refrigerated transport container according to any of the aspects described herein.

The invention claimed is:

1. A scrubber apparatus for a refrigerated transport container having a cargo space, the scrubber apparatus comprising:
　　a regenerating adsorber configured to permit flow therethrough for adsorption or desorption of a controlled gas;
　　a manifold in fluid communication with a first side of the adsorber, comprising:
　　　　an interior gas port for fluid communication with interior gas in the cargo space;
　　　　an exterior gas port for fluid communication with exterior gas outside of the cargo space;
　　　　an adsorption control damper at the interior gas port for controlling selective fluid communication between the adsorber and interior gas; and
　　　　a regeneration control damper at the exterior gas port for controlling selective fluid communication between the adsorber and exterior gas; and
　　a common actuator configured to actuate both the adsorption control damper and the regeneration control damper to move between an adsorption configuration, in which the adsorption control damper is open to permit an interior gas flow through the adsorber and the regeneration control damper is closed, and a regeneration configuration, in which the regeneration control damper is open to permit an exterior gas flow through the adsorber and the adsorption control damper is closed.

2. A scrubber apparatus according to claim 1, wherein each one of the adsorption control damper and the regeneration control damper is biased to a bias position which is either an open position or a closed position of the respective damper.

3. A scrubber apparatus according to claim 2, wherein the common actuator comprises a rotatable common actuation element configured to rotate in a first direction to move the adsorption control damper away from its bias position and to rotate in an opposing second direction to move the regeneration control damper away from its bias position.

4. A scrubber apparatus according to claim 1, wherein the manifold and the adsorber are provided in a housing.

5. A scrubber apparatus according to claim 4, wherein the air dampers are provided within the housing.

6. A scrubber apparatus according to claim 4, further comprising an air mover between the manifold and the adsorber.

7. A scrubber apparatus according to claim 4, wherein the housing has a layered structure such that the adsorber is provided in an adsorber layer and the manifold is provided in air control layer superposed on the adsorber layer for switching between the adsorption configuration and the regeneration configuration.

8. A scrubber apparatus according to claim 1, further comprising a heater disposed upstream of the adsorber and downstream of the manifold.

9. A scrubber apparatus according to claim 8, further comprising a heater controller, wherein the heater controller is configured to heat interior gas upstream of the adsorber in the adsorption configuration.

10. A scrubber apparatus according to claim 9, wherein the heater controller is configured to control the heater to raise the temperature of the interior gas by a threshold increase.

11. A scrubber apparatus according to claim 1, wherein the manifold is one of two such manifolds at opposing sides of the adsorber.

12. A scrubber apparatus according to claim 11, wherein the common actuator is configured to actuate the adsorption control dampers and the regeneration control dampers at each manifold to move between the adsorption configuration and the regeneration configuration.

13. A scrubber apparatus for a refrigerated transport container having a cargo space, the scrubber apparatus comprising:
 a regenerating adsorber configured to permit flow therethrough for adsorption or desorption of a controlled gas;
 an air damper module configured to switch the apparatus between an adsorption configuration in which the adsorber is to receive interior gas from the cargo space and discharge treated interior gas to the cargo space; and a regeneration configuration in which the adsorber is to receive exterior gas from outside of the cargo space and discharge exterior gas enriched with the controlled gas;
 a heater configured to heat gas provided to the adsorber; and
 a heater controller configured to operate the heater to heat interior gas provided to the adsorber when the air damper module is in the adsorption configuration.

14. A scrubber apparatus according to claim 13, wherein the heater controller is configured to operate the heater in a first mode to heat interior gas when the apparatus is in the adsorption configuration, and to operate the heater in a second mode to heat exterior gas when the apparatus is in the regeneration configuration.

15. A refrigerated transport container or a refrigeration system for a refrigerated transport container, comprising:
 an evaporator heat exchanger for receiving a return flow of interior gas from a cargo space for cooling;
 a scrubber apparatus, the scrubber apparatus including:
  a regenerating adsorber configured to permit flow therethrough for adsorption or desorption of a controlled gas;
  a manifold in fluid communication with a first side of the adsorber, comprising:
   an interior gas port for fluid communication with interior gas in the cargo space;
   an exterior gas port for fluid communication with exterior gas outside of the cargo space;
   an adsorption control damper at the interior gas port for controlling selective fluid communication between the adsorber and interior gas; and
   a regeneration control damper at the exterior gas port for controlling selective fluid communication between the adsorber and exterior gas; and
  a common actuator configured to actuate both the adsorption control damper and the regeneration control damper to move between an adsorption configuration, in which the adsorption control damper is open to permit an interior gas flow through the adsorber and the regeneration control damper is closed, and a regeneration configuration, in which the regeneration control damper is open to permit an exterior gas flow through the adsorber and the adsorption control damper is closed;
 wherein the scrubber apparatus is configured to receive a portion of a return flow of interior gas for removal of a controlled gas from upstream of the evaporator heat exchanger with respect to the direction of return flow, and is configured to discharge treated interior gas having passed through the adsorber at a position downstream of the evaporator.

* * * * *